United States Patent
Kim et al.

(10) Patent No.: US 8,913,194 B2
(45) Date of Patent: Dec. 16, 2014

(54) IMAGE PROCESSING APPARATUS AND METHOD OF ENHANCING VISIBILITY OF DISPLAYED IMAGE

(75) Inventors: In-ji Kim, Yongin-si (KR); Hyun-wook Ok, Seoul (KR); Chang-Yeong Kim, Yongin-si (KR); Du-sik Park, Suwon-si (KR); Young-ran Han, Suwon-si (KR); Won-hee Choe, Gyeongiu-si (KR)

(73) Assignee: Samsung Electronics Co., Ltd., Suwon-Si (KR)

(\*) Notice: Subject to any disclaimer, the term of this patent is extended or adjusted under 35 U.S.C. 154(b) by 1754 days.

(21) Appl. No.: 11/768,412

(22) Filed: Jun. 26, 2007

(65) Prior Publication Data

US 2008/0002062 A1 Jan. 3, 2008

(30) Foreign Application Priority Data

Jun. 27, 2006 (KR) .............................. 10-2006-58217

(51) Int. Cl.
 *H04N 5/57* (2006.01)
 *H04N 5/58* (2006.01)
 *H04N 5/00* (2011.01)
 *G06T 5/00* (2006.01)

(52) U.S. Cl.
 CPC ....... *G06T 5/009* (2013.01); *G06T 2207/10024* (2013.01); *G06T 2207/20081* (2013.01)
 USPC .......................................... 348/602; 348/607

(58) Field of Classification Search
 USPC ........................................................ 348/602
 See application file for complete search history.

(56) References Cited

U.S. PATENT DOCUMENTS

| | | | |
|---|---|---|---|
| 5,757,438 A * | 5/1998 | Yoon et al. ................... | 348/603 |
| 6,285,413 B1 | 9/2001 | Akbayir | |
| 6,727,489 B2 | 4/2004 | Yano | |
| 6,778,691 B1 * | 8/2004 | Barski et al. .................. | 382/132 |

(Continued)

FOREIGN PATENT DOCUMENTS

| | | |
|---|---|---|
| EP | 1801767 | 6/2007 |
| JP | 9-149337 | 6/1997 |

(Continued)

OTHER PUBLICATIONS

Notice of Allowability issued in corresponding Korean Patent Application No. 2006-0058217 dated Aug. 31, 2007.

(Continued)

*Primary Examiner* — Ricky Chin
(74) *Attorney, Agent, or Firm* — Staas & Halsey LLP (57) ABSTRACT

An image processing apparatus and method to reduce the deterioration of visibility of an image displayed on an image display device occurring under various lighting conditions when the brightness of ambient light is brighter than that of the image display device, and includes a sensor to sense the brightness of an external light, a unit to store a luminance-contrast model curve representing an optimal contrast value for a particular luminance for each brightness of the external light, a unit to determine a target luminance value according to the sensed brightness of the external light, to obtain a contrast value corresponding to the target luminance value with reference to the luminance-contrast model curve corresponding to the sensed brightness, and to adjust an input image to have the target luminance value and the obtained contrast value, and a unit to adjust the saturation of the adjusted input image according to the target luminance value and the obtained contrast value.

17 Claims, 5 Drawing Sheets

(56) References Cited

U.S. PATENT DOCUMENTS

| | | | |
|---|---|---|---|
| 7,119,852 B1* | 10/2006 | Vandeginste | 348/602 |
| 7,352,410 B2* | 4/2008 | Chou | 348/673 |
| 7,580,169 B2* | 8/2009 | Fukuda | 358/538 |
| 2004/0013298 A1* | 1/2004 | Choe et al. | 382/167 |
| 2004/0178974 A1 | 9/2004 | Miller et al. | |
| 2004/0212838 A1* | 10/2004 | Yamamoto et al. | 358/2.1 |
| 2005/0163393 A1* | 7/2005 | Asari | 382/254 |
| 2006/0187359 A1* | 8/2006 | Soupliotis et al. | 348/700 |
| 2006/0239581 A1* | 10/2006 | Neuman | 382/274 |
| 2007/0053587 A1* | 3/2007 | Ali | 382/168 |
| 2007/0103596 A1* | 5/2007 | Hsu | 348/649 |
| 2007/0104388 A1* | 5/2007 | Ali | 382/274 |
| 2007/0285516 A1* | 12/2007 | Brill et al. | 348/189 |
| 2010/0260436 A1* | 10/2010 | Watanabe et al. | 382/266 |

FOREIGN PATENT DOCUMENTS

| | | |
|---|---|---|
| JP | 2003-051000 | 2/2003 |
| JP | 2004-252620 | 9/2004 |
| JP | 2004-354872 | 12/2004 |
| JP | 2005-227436 | 8/2005 |
| JP | 2005-341220 | 12/2005 |
| JP | 2006-119200 | 5/2006 |
| KR | 2001-1597 | 1/2001 |
| KR | 2001-113257 | 12/2001 |
| KR | 2005-13767 | 2/2005 |
| WO | WO 00/60855 | 10/2000 |

OTHER PUBLICATIONS

Notice of Examination Report issued Jun. 28, 2007 by the Korean Intellectual Property Office re: Korean Patent Application 2006-58217 (3 pp).

Choe et al. "High Quality Image Processing for Mobile Displays," Samsung Journal of Innovative Technology. vol. 2, No. 1, Feb. 2006 pp. 119-130.

Extended European Search Report dated Aug. 5, 2013 from European Patent Application No. 07111020.9, 9 pages.

* cited by examiner

FIG. 5

IMAGE PROCESSING APPARATUS AND METHOD OF ENHANCING VISIBILITY OF DISPLAYED IMAGE

CROSS-REFERENCE TO RELATED APPLICATION

This application claims the benefit of Korean Application No. 2006-58217, filed Jun. 27, 2006 in the Korean Intellectual Property Office, the disclosure of which is incorporated herein by reference.

BACKGROUND OF THE INVENTION

1. Field of the Invention

Aspects of the present invention relate to an image processing apparatus and method, and more particularly, to an image processing apparatus and method which can prevent or reduce the deterioration of visibility of an image displayed on an image display device occurring under various lighting conditions when the brightness of ambient light is brighter than that of the image display device.

2. Description of the Related Art

Recently, a variety of digital devices that meet the diverse needs of consumers have come into wide use. These digital devices range from those having large-sized displays, such as computers and digital televisions (TVs), to those having small-sized displays, such as mobile phones, personal digital assistants (PDAs), and portable multimedia players (PMPs).

Unlike large-sized digital devices, small-sized digital devices, such as mobile phones, can be used not only in fixed settings but also in various locations, such as in dark rooms or in outdoor environments under direct sunlight. Therefore, required is a method of providing appropriate brightness and contrast of an image displayed under a given external luminance to optimally display an image. In other words, when the external luminance is high, the brightness and contrast of the displayed image must be increased.

However, it is difficult to clearly determine a specific method of adjusting the brightness and the contrast of the displayed image according to changes in external luminance. The same is true for saturation. That is, it is also difficult to determine a specific method of adjusting saturation according to changes in the brightness and the contrast of the displayed image.

In this regard, various related technologies to prevent or reduce the deterioration of visibility in digital devices have been suggested, including display technologies based on external luminance information.

These related technologies may be classified into technologies for improving an image quality through signal processing and technologies for improving an image quality through a device change. In particular, the technologies for improving the image quality through signal processing include a color tonal contrast processing technology and a luminance tonal contrast processing technology. The related technologies for improving image quality through signal processing are disclosed, for example, in U.S. Pat. No. 6,727,489 and Korean Patent Publication No. 2005-13767.

Specifically, U.S. Pat. No. 6,727,489 relates to an adaptive color processing technology using information regarding the brightness and color of ambient light of a projector or a reflective surface. However, the adaptive color processing technology fails to consider saturation and requires information regarding both the brightness and color of an external light source. In addition, Korean Patent Publication No. 2005-13767 relates to a technology for improving the contrast of a displayed image by minimizing de-fading according to changes in the luminance of the ambient light. However, this technology is simply directed to improving the contrast based on the luminance and does not consider the luminance and the saturation of an image.

SUMMARY OF THE INVENTION

Aspects of the present invention provide an apparatus and method of enhancing the brightness and contrast of an image based on brightness information of an external light and adjusting the saturation of the image, to thereby enhance the visibility of the image.

According to an aspect of the present invention, an image processing apparatus includes a luminance sensor to sense a brightness of an external light; a model storage unit to store a luminance-contrast model curve representing an optimal contrast value for a particular luminance of each brightness of the external light; a luminance-contrast adjustment unit to determine a target luminance value according to the sensed brightness of the external light, to obtain a contrast value corresponding to the target luminance value with reference to the luminance-contrast model curve corresponding to the sensed brightness of the external light, and to adjust an input image to have the target luminance value and the obtained contrast value; and a saturation adjustment unit to adjust the saturation of the adjusted input image according to the target luminance value and the obtained contrast value.

According to another aspect of the present invention, an image processing method includes sensing a brightness of an external light; reading a luminance-contrast model curve representing an optimal contrast value of a particular luminance for each brightness of the external light; determining a target luminance value according to the sensed brightness of the external light, obtaining a contrast value corresponding to the target luminance value with reference to the luminance-contrast model curve corresponding to the sensed brightness of the external light, and adjusting an input image to have the target luminance value and the obtained contrast value; and adjusting the saturation of the adjusted input image according to the target luminance value and the obtained contrast value.

According to another aspect of the present invention, an image processing method includes detecting an external luminance of an external environment; detecting an input luminance and an input contrast of an input image; obtaining one or more stored luminance-contrast model curves corresponding to the external luminance; determining a target luminance based on the detected input luminance and a target contrast corresponding to the target luminance from at least one of the stored luminance-contrast model curves; and adjusting the input luminance and the input contrast of the input image to those of the target luminance and the target contrast, respectively, for subsequent display of the input image.

According to another aspect of the present invention, an image processing apparatus includes a storage to store one or more stored luminance-contrast model curves corresponding to an external luminance of an external environment; and a processor to detect the external luminance, to receive an input image having an input luminance and an input contrast, to obtain one or more stored luminance-contrast model curves corresponding to the external luminance, to determine a target luminance based on the detected luminance and a target contrast corresponding to the target luminance from at least one of the stored luminance-contrast model curves stored in the storage, and to adjust the input luminance and the input contrast of the input image to those of the target luminance and the target contrast, respectively, for subsequent display of the input image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to aspects of the present invention, examples of which are illustrated in the accompanying drawings, wherein like reference numerals refer to the like elements throughout. The aspects are described below in order to explain the present invention by referring to the figures.

Figure 1:
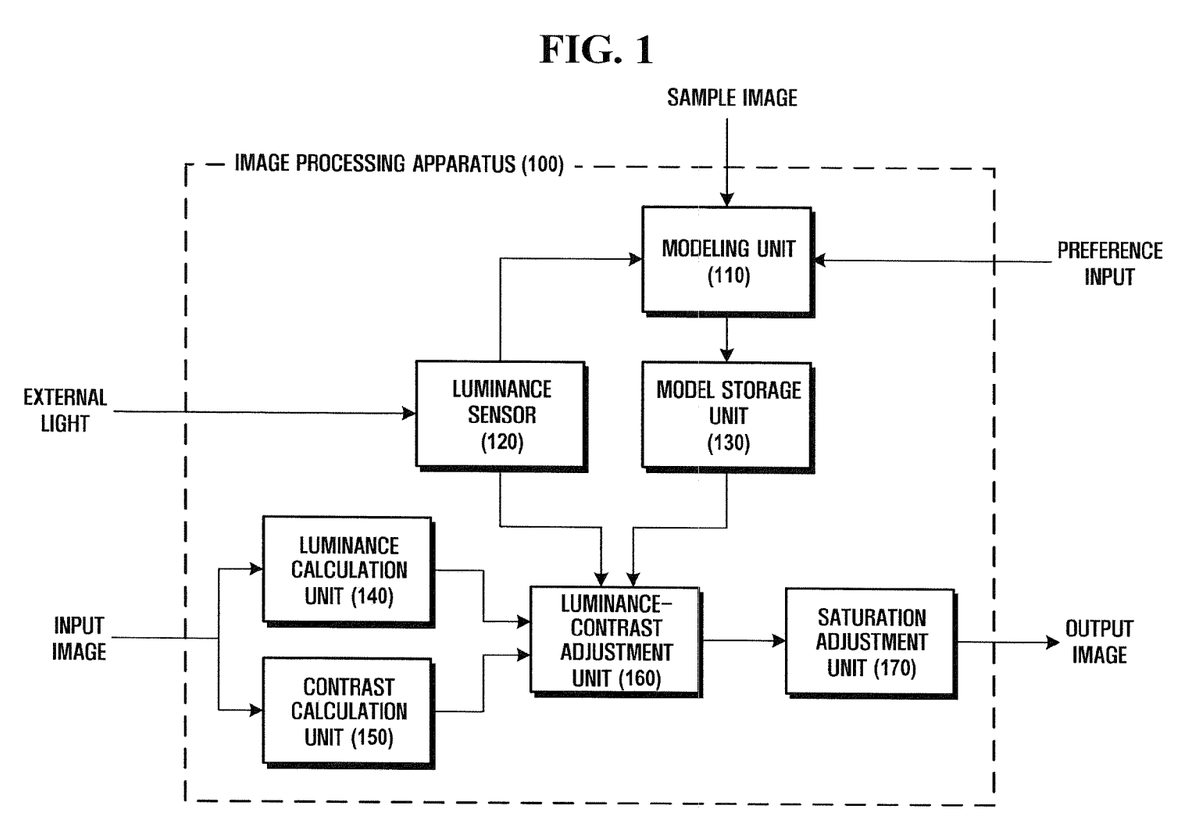
FIG. 1 is a block diagram of an image processing apparatus according to an aspect of the present invention.

FIG. 1 is a block diagram of an image processing apparatus 100 according to an aspect of the present invention. In the non-limiting aspect shown in FIG. 1, the image processing apparatus 100 includes a model setting unit (or a modeling unit) 110, a luminance sensor 120, a model storage unit 130, a luminance calculation unit 140, a contrast calculation unit 150, a luminance-contrast adjustment unit 160, and a saturation adjustment unit 170. The image processing apparatus 100 may be embedded or used in various image display devices, including displays, such as televisions (TVs), mobile phones, and/or projectors.

The modeling unit 110 receives a plurality of image samples (or sample images), and sets or generates an optimal relationship graph between a luminance (or a luminance value) and a contrast of one or more sample images for a particular external luminance (or an external luminance value). The modeling unit 110 also receives preferences (or inputs) from one or more users used to identify an optimal (or a preferred) contrast value according to the external luminance and according to the luminance of the sample images. In the aspect shown, a user may input one of a predetermined number of luminance values.

The luminance sensor 120 receives an external light and senses an external luminance of an external environment in which the image processing apparatus 100 is situated. The luminance sensor 120 may be implemented using various technologies or devices known to those of ordinary skill in the art. The external luminance of the external environment sensed by the luminance sensor 120 may be provided to the luminance-contrast adjustment unit 160 or the modeling unit 110.

The model storage unit 130 stores luminance-contrast model curves for various external luminances that are provided or generated by the modeling unit 110.

The luminance calculation unit 140 calculates a luminance of an input image. Generally, the luminance (Y) can be obtained by calculating a weighted sum of a red (R), a green (G), and a blue (B) component or (RGB) components of an image. In various aspects, since luminance can be calculated for each pixel, the luminance of an image is a representative value of the luminances of pixels include in the image. The representative value may be a mean, a median, or a mode value.

The contrast calculation unit 150 calculates the contrast of the input image. There are various methods of calculating the contrast of an image, such as the input image. In aspects of the present invention, a cumulative distribution function (CDF) is used to calculate the contrast of the input image. The use of the CDF is discussed in detail in connection with FIG. 2.

The luminance-contrast adjustment unit 160 determines the luminance and the contrast appropriate for the external luminance with reference to one or more luminance-contrast model curves stored in the modeling unit 130, and converts or adjusts the luminance and the contrast of the input image accordingly.

The saturation adjustment unit 170 changes a saturation value of the input image according to the luminance and contrast adjusted or determiner by the luminance-contrast adjustment unit 160.

Figure 2:
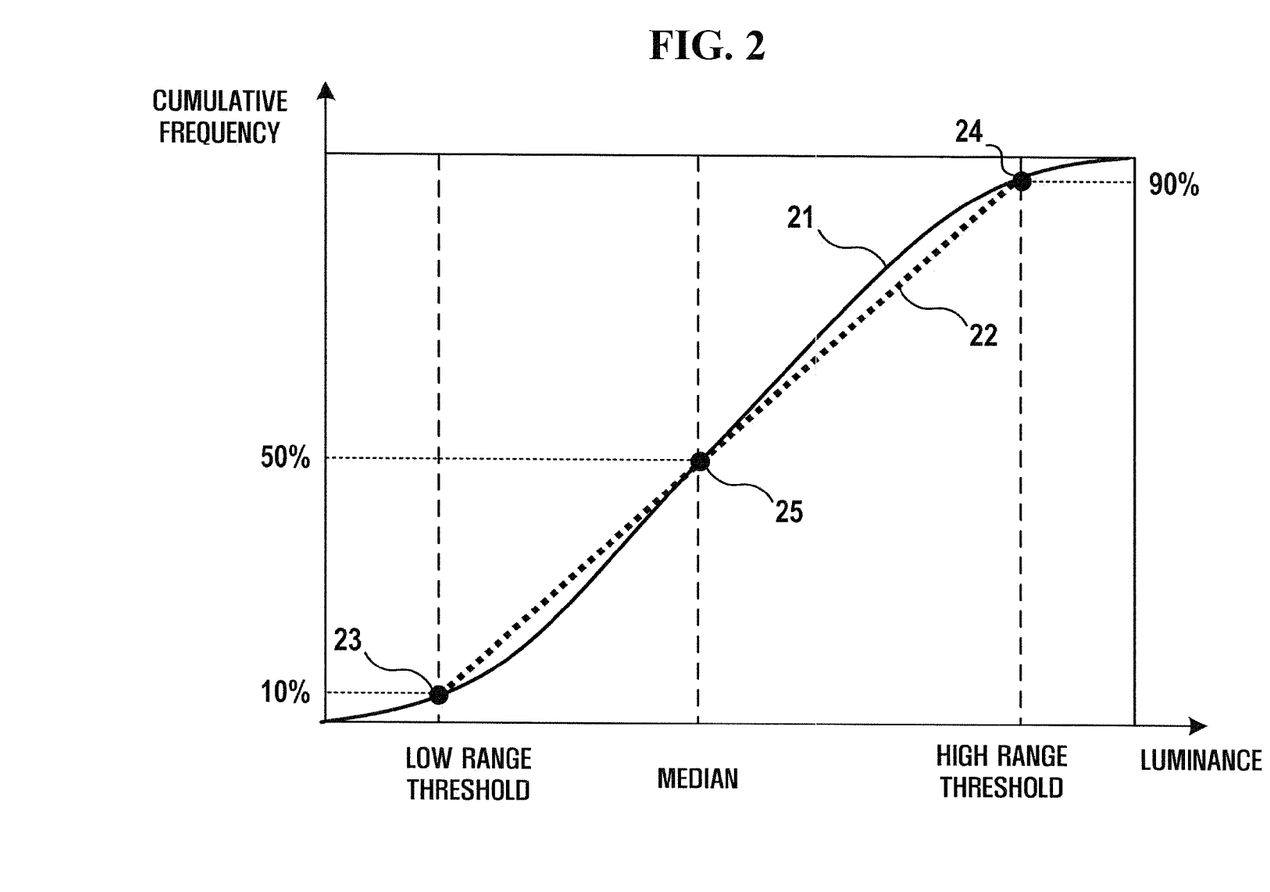
FIG. 2 illustrates a process of calculating the contrast of an input image according to an aspect of the present invention.

FIG. 2 illustrates a process of calculating a contrast of an input image according to an aspect of the present invention. The process may be performed by the contrast calculating unit 150. Referring to FIG. 2, a cumulative distribution function (CDF) graph 21 of the luminance of the input image is shown. The CDF graph 21 is a cumulative frequency curve of the input image. A slope m_Slope of a line 22, connecting points 23 and 24 at which the CDF graph 21 meets a low range threshold value and a high range threshold value, respectively, may be considered to be the contrast value of the input image. The low and high range threshold values 23, 24 may be set arbitrarily, though not required. For example, the low range threshold value 23 may be defined as a luminance value of the input image when the cumulative frequency thereof is 10%, and the high range threshold value 24 may be defined as a luminance value of the input image when the cumulative frequency thereof is 90%. The line 22 may pass through a point 25 at which a median value of the luminance of the input image meets the CDF graph 21. In other aspects, other percentage values or values of luminance are within the scope of the present invention.

Figure 3:
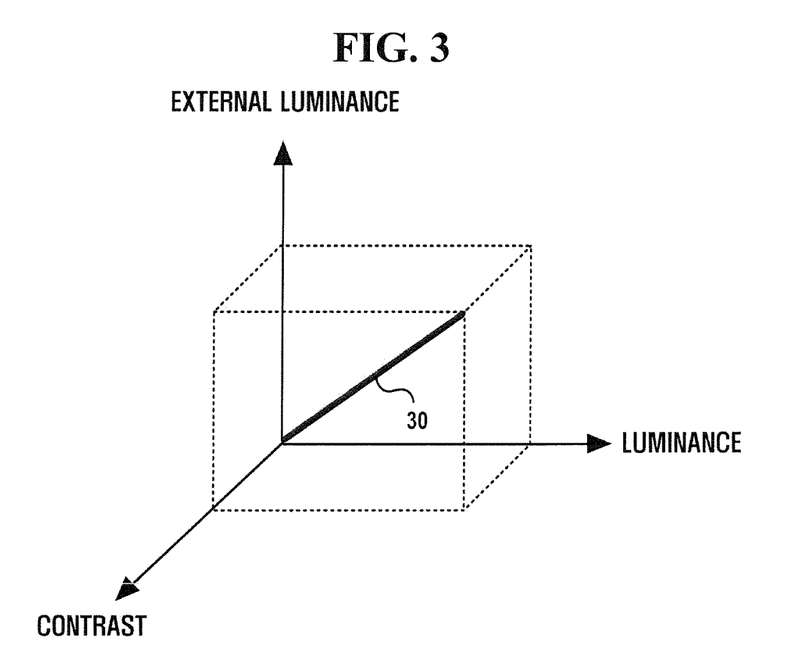
FIG. 3 is a graph illustrating the relationship among an external luminance, a luminance, and a contrast.

FIG. 3 is a graph 30 illustrating the relationship among an external luminance, a luminance, and a contrast of a sample image, which may be set or generated by the modeling unit 110. Generally, when the luminance of an image is changed according to the external luminance, the contrast of the image must be changed or adjusted accordingly. If the relationship graph 30 among these three variables (i.e., the external luminance, the luminance, and the contrast) can be determined as illustrated in FIG. 3, then a change in the luminance value of the image at a particular external luminance (or a given external luminance), as well as the contrast value that must be changed or adjusted accordingly, can all be identified or determined.

Further, in aspects of the present invention, the modeling unit 110 receives input of preferences from a plurality of users, and is able to identify optimal contrast values according to the external luminance and the luminances of the sample images. In the aspect shown, the users may input one of a predetermined number of selections. In other aspects, the modeling unit 110 may contain predetermined preferences to identify optimal contrast values, or may obtain predetermined preferences from a source other than the plurality of users.

The predetermined number of selections may be set as follows. Specifically, after a possible external luminance range is set or determined, one or more luminance intervals may be set or determined within the external luminance range. For example, if the possible external luminance range is 100 lux to 10,000 lux and the luminance interval is 100 lux, a total of 100 discrete external luminances (or luminance intervals) can be set. In other aspects, the luminance intervals need not necessarily be regularly spaced. Accordingly, the modeling unit 110 obtains or determines a luminance-contrast model curve for each interval of the external luminance, for example.

To obtain the luminance-contrast model curve for a particular luminance, the modeling unit 110, obtains user's preferences as the contrast is varied or changed. The preference according to the varying or changing contrast forms a curve, which is referred to as a reaction curve. If a sample image is an 8-bit image, the luminance of the sample image will have a range from 0 to 255. In the aspect shown, the modeling unit 110 obtains the reaction curve by repeatedly increasing the luminance of the sample image by 10 starting from 0 until 255 is reached. In various aspects, the luminance and/or the contrast may be selectable. In yet other aspects, the luminance-contrast model curve may be predetermined, obtained, or generated from a source other than the plurality of users, and may even be generated automatically without user input.

Figure 4:
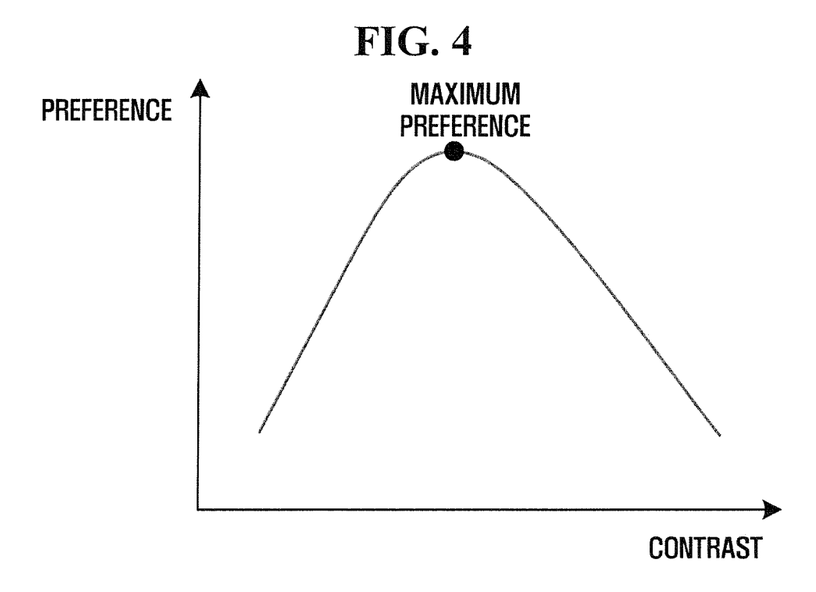
FIG. 4 illustrates a reaction curve according to an aspect of the present invention.

FIG. 4 illustrates a reaction curve according to an aspect of the present invention. To obtain the reaction curve, the modeling unit 110 receives preferences (or inputs) from a plurality of users while the contrast is changed from a minimum value to a maximum value for a particular luminance value (e.g., changing the slope of FIG. 2). In the aspect shown, the preferences according to the contrast have a distribution similar to that of a normal distribution resulting from the fact that it is difficult for users to perceive an image as being a natural looking image when the contrast of the image is either very low or very high. Therefore, the maximum preference point for the contrast is located in the middle of the reaction curve. In various aspects, the reaction curve may be collected to represent a graph of preferential contrast values for an entire range of luminances.

Figure 5:
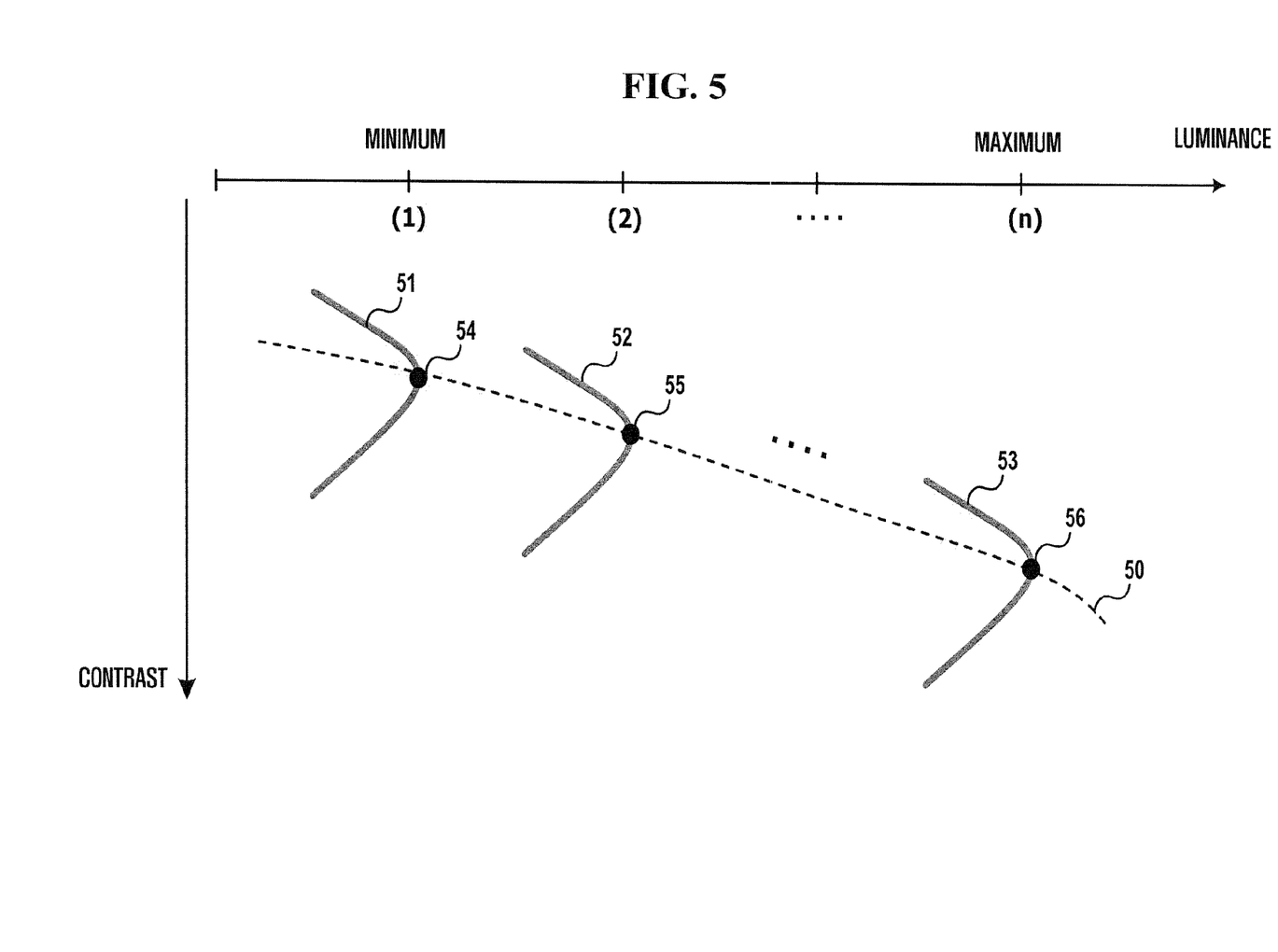
FIG. 5 illustrates reaction curves depicted over an entire luminance range.

FIG. 5 illustrates reaction curves 51, 52, and 53, similar to the reaction curve of FIG. 4, which are depicted over an entire luminance range. Referring to FIG. 5, a luminance-contrast model curve 50 can be obtained by interpolating the maximum preference points of the respective reaction curves 51, 52, and 53. The luminance-contrast model curve 50 best fits points 54, 55, and 56 of the maximum preferences of the reaction curves 51, 52, and 53, respectively obtained for each of the luminance levels. In the luminance-contrast model curve 50 as shown, the horizontal axis indicates luminance values, and the vertical axis indicates optimal (or most preferred) contrast values corresponding to the luminance values.

In the non-limiting aspect as shown in FIG. 5, the luminance-contrast model curve 50 is for one external luminance. If the above discussed operation is repeatedly performed for all discrete external luminances, and then interpolated, luminance-contrast model curves for all external luminances can be obtained.

As noted above, the modeling unit 110 obtains one or more luminance-contrast model curves 50. Each of the obtained luminance-contrast model curves 50 is stored in the model storage unit 130 according to the various external luminances provided by the modeling unit 110.

Based on the above obtained luminance-contrast model curves 50, the he luminance-contrast adjustment unit 160 determines a luminance value and a contrast value appropriate for a current (detected) external luminance and converts or adjusts the luminance and contrast values of the input image into the above determined luminance and contrast values. To this end, the amount of change to be made in the luminance and contrast of the input image must be calculated. The amount of luminance change is the difference between the determined luminance value and the luminance value of the input image calculated by the luminance calculation unit 140. The amount of contrast change is the difference between the determined contrast value and the contrast value of the input image calculated by the contrast calculation unit 150.

The luminance-contrast control unit 160 determines how much to change the luminance value of the input image, which is calculated by the luminance calculation unit 140, according to the current external luminance provided by the luminance sensor 120. In other words, the luminance-contrast adjustment unit 160 determines the amount of luminance change or adjusts a target luminance value. For example, the luminance value of the input image may be designed to be proportional to the external luminance. Thus, if the external luminance increases by a predetermined rate, the luminance value of the input image may be increased accordingly. Various relational expressions other than a simple linear proportional expression can be used to obtain the relationship between the luminance and the external luminance as long as the proportional relationship between the luminance and the external luminance is maintained. In various aspects, the relationship between the luminance and the external luminance may be an exponential function and/or a logarithmic function.

In the non-limiting aspect shown, by referencing the luminance-contrast model curves of one or more specific external luminances stored in the model storage unit 130, the luminance-contrast adjustment unit 160 obtains a contrast value corresponding to the above determined luminance value of the input image. Further, the luminance-contrast adjustment unit 160 adjusts the luminance of the current input image (or luminance level) to substantially or exactly match the determined target luminance value. Similarly, the luminance-contrast adjustment unit 160 adjusts the contrast of the current input image (or contrast level) having the adjusted luminance level to substantially or exactly match the above obtained contrast value.

In an aspect of the present invention, changing the luminance and the contrast of the input image based on the external luminance alone as described above may not be sufficient to provide an optimal image (or a natural looking image) to users. For example, when the luminance and the contrast are increased, subjective saturation is reduced. Therefore, the saturation adjustment unit 170 changes or adjusts the saturation of the input image according to changes made in the luminance and the contrast.

Methods of changing or adjusting the saturation of the input image include a method of directly changing a saturation component (S) in a hue/saturation/value (HSV) color space and a method of appropriately converting RGB components using a saturation matrix, among others. In other aspects, various saturation change methods are within the scope of the present invention.

In the non-limiting aspect shown, the saturation adjustment unit 170 changes the saturation value according to the luminance and contrast values determined by the luminance-contrast adjustment unit 160. In other words, the saturation adjustment unit 170 increases or decreases the saturation of the input image when the luminance and contrast values are increased or decreased, respectively. Accordingly, in this way, by adaptively changing the saturation of an output image according to changes in the luminance and contrast values, a natural looking image can be displayed or provided to users.

In various aspects of the present invention, the components illustrated in FIG. 1 may be implemented as software components such as tasks, classes, subroutines, processes, objects, executable threads, or programs performed in a predetermined region of a memory, or implemented as hardware components such as a Field Programmable Gate Array (FPGA) or Application Specific Integrated Circuit (ASIC). Alternatively, the components may be composed of a combination of the software and hardware components.

Figure 6:
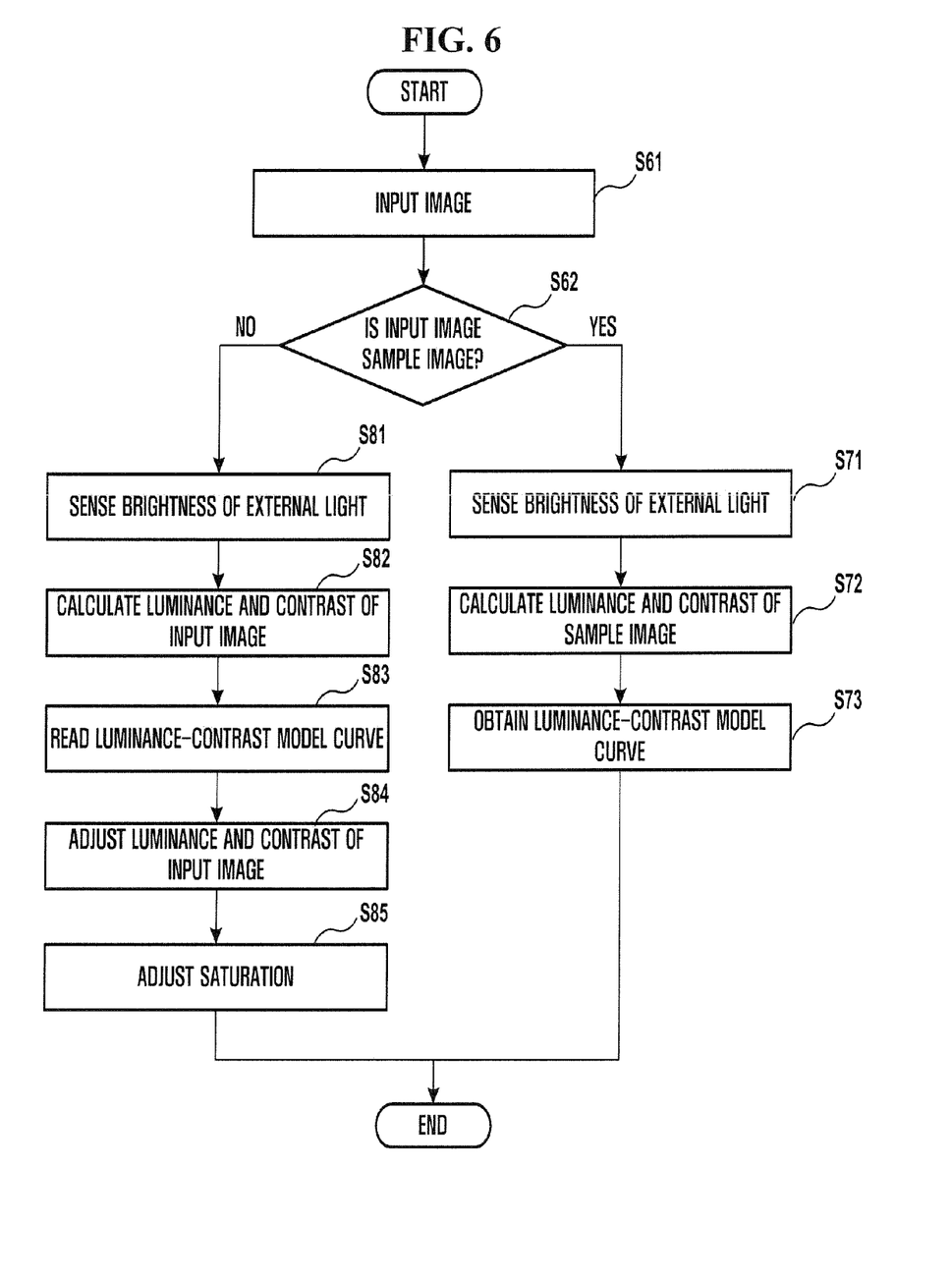
FIG. 6 is a flowchart illustrating an image adjustment method according to an aspect of the present invention.

These components may be stored in a computer-readable storage medium, and some of the components may be distributed in a plurality of computers. FIG. 6 is a flowchart illustrating an image adjustment method according to an aspect of the present invention.

Referring to FIG. 6, when an image is input (operation S61), the modeling unit 110, shown in FIG. 1, determines whether the input image is a sample image generated by a modeling process or an actual input image to be adjusted (operation S62). If the input image is a sample image, operation S71 and its subsequent operations are performed. If the input image is not a sample image, operation S81 and its subsequent operations are performed.

When the input image is an actual input image, the image adjustment method includes sensing the brightness of external light using the luminance sensor 120 (operation S81), calculating the luminance of the input image using the luminance calculation unit 140 and calculating the contrast of the input image using the contrast calculation unit 150 (operation S82), reading or obtaining the one or more luminance-contrast model curves stored in the model storage unit 130 (operation S83), determining a target luminance value according to the sensed brightness (or luminance) of the external light, obtaining the contrast value corresponding to the above determined target luminance value, and adjusting the input image to have the determined target luminance value and the obtained contrast value using the luminance-contrast adjustment unit 160 (operation S84), and/or adjusting the saturation of the adjusted input image according to the determined target luminance value and the obtained contrast value using the saturation adjustment unit 170 (operation S85).

As noted above, in operation S84, the luminance-contrast adjustment unit 160 adjusts the luminance value of the input image to that of the determined target luminance value and adjusts the contrast value of the input image having the adjusted luminance value to that of the obtained contrast value.

As noted above, in operation S85, the saturation adjustment unit 170 increases or decreases the saturation of the input image when the luminance and contrast of the input image are increased or decreased by the luminance-contrast adjustment unit 160. In the aspect shown, the saturation adjustment unit 170 may convert the input image with the adjusted luminance and contrast in an HSV color space and adjust a saturation component of the input image in the HSV color space. In addition, the saturation unit 170 may convert the luminance and contrast adjusted input image using a saturation matrix.

As noted above, the image adjustment method may further include calculating the luminance of the input image using the luminance calculation unit 140 and calculating the contrast of the input image using the contrast calculation unit 150 (operation S82). In the aspect shown, the luminance calculation unit 140 may calculate the luminance of the input image as a linear combination of the RGB components of the input image, and the contrast calculation unit 150 may calculate the contrast of the input image as the slope of a line connecting points at which a cumulative distribution function (CDF) according to the luminance of the input image meets a low range threshold value and a high range threshold value, respectively. In the aspect shown, the line note above passes through a point at which the cumulative distribution function (CDF) and a median value of the luminance meet.

On the other hand, when the input image is the sample image, the image adjustment method includes sensing the brightness of the external light (operation S71) and calculating the luminance and contrast of the sample image (operation S72). Also, the method includes obtaining contrast values having the user's maximum preference relating to a changing luminance of the sample image at a particular external luminance and generating a luminance-contrast model curve by interpolating points depicted by the contrast values (operation S73). The maximum preference may be determined based on input of preferences by a plurality of users.

As described above, aspects of the present invention can enhance visibility of a display included in a digital device by providing a user with an image which dynamically responds to changes in external luminance.

Various components of the image processing apparatus 100, as shown in FIG. 1, such as the modeling unit 110, the luminance sensor 120, the luminance calculation unit 140, the contrast calculation unit 150, the luminance-contrast adjustment unit 160, and/or the saturation adjustment unit 170 can be integrated into a single control unit, or alternatively, can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the modeling unit 110 may contain predetermined preferences to identify optimal contrast values, or may obtain predetermined preferences from a source other than the plurality of users. The luminance and/or the contrast may both be preferentially selectable. The luminance-contrast model curve may be predetermined, obtained, or generated from a source other than the plurality of users, and may even be done automatically without user input. The reaction curve may be collected to represent a graph of preferential contrast values for an entire range of luminances. The relationship between the luminance and the external luminance may be an exponential function and/or a logarithmic function. Various saturation change methods are within the scope of the present invention.

What is claimed is:

1. An image processing apparatus comprising:
   a luminance sensor to sense a brightness of an external light;
   a contrast calculation unit to calculate a contrast value of the input image by calculating the contrast of the input image as a slope of a line connecting points at which a cumulative distribution function meets a low range threshold value and a high range threshold value, respectively;
   a model storage unit to store a luminance-contrast model curve representing an optimal contrast value for a particular luminance of each brightness of the external light;
   a luminance-contrast adjustment unit to determine a target luminance value according to the sensed brightness of the external light, to obtain a contrast value corresponding to the target luminance value with reference to the luminance-contrast model curve corresponding to the sensed brightness of the external light, and to adjust an input image to have the target luminance value and the obtained contrast value; and
   a saturation adjustment unit to adjust the saturation of the adjusted input image by increasing the saturation of the input image when the luminance and the contrast of the input image are increased by the luminance-contrast adjustment unit, and by decreasing the saturation of the input image when the luminance and the contrast of the input image are decreased by the luminance-contrast adjustment unit.

2. The apparatus of claim 1, further comprising:
   a luminance calculation unit to calculate a luminance value of the input image.

3. The apparatus of claim 2, wherein the luminance calculation unit calculates the luminance of the input image as a linear combination of red, green, and blue (RGB) components of the input image.

4. The apparatus of claim 2, wherein the contrast calculation unit calculates the contrast of the input image as a slope of a line connecting points at which a cumulative distribution function meets a low range threshold value and a high range threshold value, respectively.

5. The apparatus of claim 1, wherein the luminance-contrast adjustment unit adjusts the luminance value of the input image to that of the target luminance value, and adjusts the contrast value of the input image having the adjusted luminance value to that of the obtained contrast value.

6. The apparatus of claim 1, wherein the saturation adjustment unit converts the input image having the adjusted luminance and contrast in a hue/saturation/value (HSV) color space and adjusts a saturation component of the input image in the HSV color space.

7. The apparatus of claim 1, wherein the saturation adjustment unit converts the input image having the adjusted luminance and contrast using a saturation matrix.

8. An image processing method comprising:
   sensing a brightness of an external light;
   calculating the contrast of the input image by calculating the contrast of the input image as a slope of a line connecting points at which a cumulative distribution function meets a low range threshold value and a high range threshold value, respectively;
   reading a luminance-contrast model curve representing an optimal contrast value for a particular luminance of each brightness of the external light;
   determining a target luminance value according to the sensed brightness of the external light, obtaining a contrast value corresponding to the target luminance value with reference to the luminance-contrast model curve corresponding to the sensed brightness of the external light, and adjusting an input image to have the target luminance value and the obtained contrast value; and
   adjusting a saturation of the adjusted input image by increasing the saturation of the input image when the luminance and the contrast of the input image are increased after the adjustment of the input image, and by decreasing the saturation of the input image when the luminance and the contrast of the input image are decreased after the adjustment of the input image.

9. The method of claim 8, further comprising:
   calculating the luminance of the input image.

10. The method of claim 9, wherein the calculation of the luminance comprises calculating the luminance of the input image as a linear combination of RGB components of the input image.

11. The method of claim 8, wherein the determining of the target luminance value comprises:
   adjusting a luminance value of the input image to that of the target luminance value; and
   adjusting a contrast value of the input image having the adjusted luminance value to that of the obtained contrast value.

12. The method of claim 8, wherein the adjusting of the saturation of the adjusted input image comprises:
  converting the input image having the adjusted luminance and contrast in an HSV color space; and
  adjusting a saturation component of the input image in the HSV color space.

13. The method of claim 8, wherein the adjusting of the saturation of the adjusted input image comprises converting the input image having the adjusted luminance and the contrast using a saturation matrix.

14. An image processing method comprising:
  detecting an external luminance of an external environment;
  detecting an input luminance and an input contrast of an input image;
  obtaining one or more stored luminance-contrast model curves corresponding to the external luminance;
  determining a target luminance based on the detected input luminance and a target contrast corresponding to the target luminance from at least one of the stored luminance-contrast model curves;
  adjusting the input luminance and the input contrast of the input image to those of the target luminance and the target contrast, respectively, for subsequent display of the input image; and
  adjusting a saturation of the adjusted input image by increasing the saturation of the input image when the luminance and the contrast of the input image are increased after the adjustment of the input image, and by decreasing the saturation of the input image when the luminance and the contrast of the input image are decreased after the adjustment of the input image,
  wherein the detecting of the input contrast of the input image comprises calculating the contrast of the input image as a slope of a line connecting points at which a cumulative distribution function meets a low range threshold value and a high range threshold value, respectively.

15. The method of claim 14, wherein the one or more stored luminance-contrast model curves includes a relationship between the external luminance, the target luminance, and/or the target contrast.

16. An image processing apparatus comprising:
  a storage to store one or more stored luminance-contrast model curves corresponding to an external luminance of an external environment; and
  a processor to detect the external luminance, to receive an input image having an input luminance and an input contrast, to obtain one or more stored luminance-contrast model curves corresponding to the external luminance, to determine a target luminance based on the detected luminance and a target contrast corresponding to the target luminance from at least one of the stored luminance-contrast model curves stored in the storage, to adjust the input luminance and the input contrast of the input image to those of the target luminance and the target contrast, respectively, and to adjust a saturation of the adjusted input image by increasing the saturation of the input image when the luminance and the contrast of the input image are increased by the processor, and by decreasing the saturation of the input image when the luminance and the contrast of the input image are decreased by the processor, for subsequent display of the input image,
  wherein the processor calculates a contrast value of the input image by calculating the contrast of the input image as a slope of a line connecting points at which a cumulative distribution function meets a low range threshold value and a high range threshold value, respectively.

17. The image processing apparatus of claim 16, wherein the one or more stored luminance-contrast model curves includes a relationship between the external luminance, the target luminance, and/or the target contrast.

\* \* \* \* \*